Figure 2:
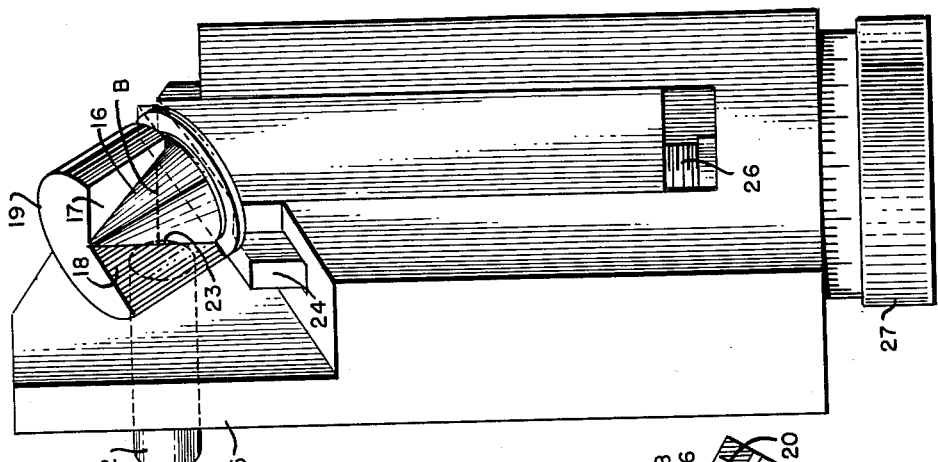

United States Patent Office 3,212,370
Patented Oct. 19, 1965

3,212,370
APPARATUS FOR FORMING A SURFACE OF PREDETERMINED CROSS-SECTION
John D. Spriggs, Glen Cove, and Robert G. Spriggs, East Northport, N.Y., assignors to Nylacore Corporation, a corporation of Delaware
Filed Apr. 1, 1963, Ser. No. 269,544
11 Claims. (Cl. 82—14)

This invention relates relates to apparatus for forming a surface of predetermined cross-section and, while it is of general application, it is particularly suitable for embodiment in an apparatus for cutting or grinding opthalmic lenses with surfaces including a spherical, paraboloidal, hyperboloidal, or cylindrical component, or a combination of two or more such components and will be specifically illustrated and described in such an embodiment.

In the application of ophthalmic contact lenses, it is important that the lens conform rather closely to the cornea of the eye, since otherwise there will be high spots or areas which will cause irritation and interfere with the normal lubrication of the eyeball by the lachrymal fluid. It is well known that the cornea of the human eye is ideally paraboloidal but, in actuality, it usually departs appreciably from the ideal. Therefore, it has heretofore been the practice, in prescribing and fitting plastic contact lenses, to mold plastic elements with a large number of more or less standard opthalmic prescriptions and then to modify the surface of the lens next to the eye empirically grinding, buffing, etc., in an attempt to get an acceptable fit.

Moreover, it is well known that the molded plastic contact lens is far from ideal optically. This is due both to normal shrinkage and warpage of the surface of the element in cooling and to undesired optical refraction arising from internal stresses in the plastic element upon cooling. A much more astisfactory lens would be one cold cut from a block of plastic material. Apparatus heretofore used in grinding ophthalmic glass lenses have not been found suitable for forming plastic contact lenses and, in fact, no apparatus is available for forming satisfactory plastic contact lenses with an accurately predetermined optical correction.

It is an object of this invention, therefore, to provide a new and improved apparatus for forming a surface of predetermined cross-section which is particularly suitable for forming plastic contact lenses.

It is another object of the invention to provide a new and improved apparatus for forming ophthalmic lenses with an accurately predetermined optical surface which may include a spherical, paraboloidal, hyperboloidal, or cylindrical component, or a combination of two or more such components.

In accordance with the invention, there is provided an apparatus for forming a surface predetermined cross-section comprising a rotatable face plate work-piece holder, a carriage movable parallel to the axis of the holder, a tool-supporting slide on the carriage movable at an acute angle to the axis of the holder, a guide having a surface of revolution of a cross-section related to the desired predetermined cross-section, and a feeler mounted on the slide and biased into engagement with the guide, the feeler and the guide being relatively so disposed that longitudinal movement of the carriage toward the holder causes the guide to cam the feeler to produce transverse movement of the tool across a work-piece in the holder.

Further in accordance with the invention, there is provided in an apparatus for forming a surface of predetermined cross-section including a frame and a tool holder movable realtive thereto and having a guide feeler for controlling its motion, a guide comprising a member having a surface of revolution of a cross-section related to said predetermined cross-section, and a pivotal support for the member having an axis tangent to the surface thereof at a point of contact with the guide feeler.

For a better understanding of the present invention, together with other and further objects thereof reference is had to the following description, taken in connection with the accompanying drawings, while its scope will be pointed out in the appended claims.

Figure 1:
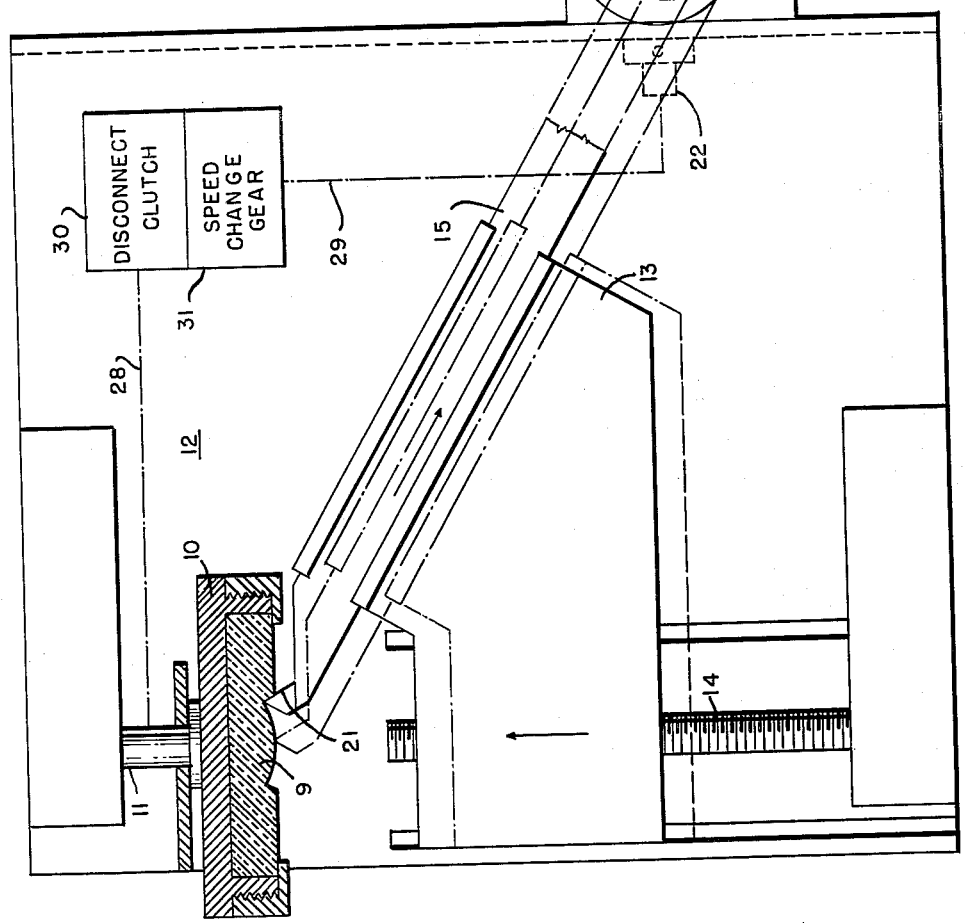
Figure 3:
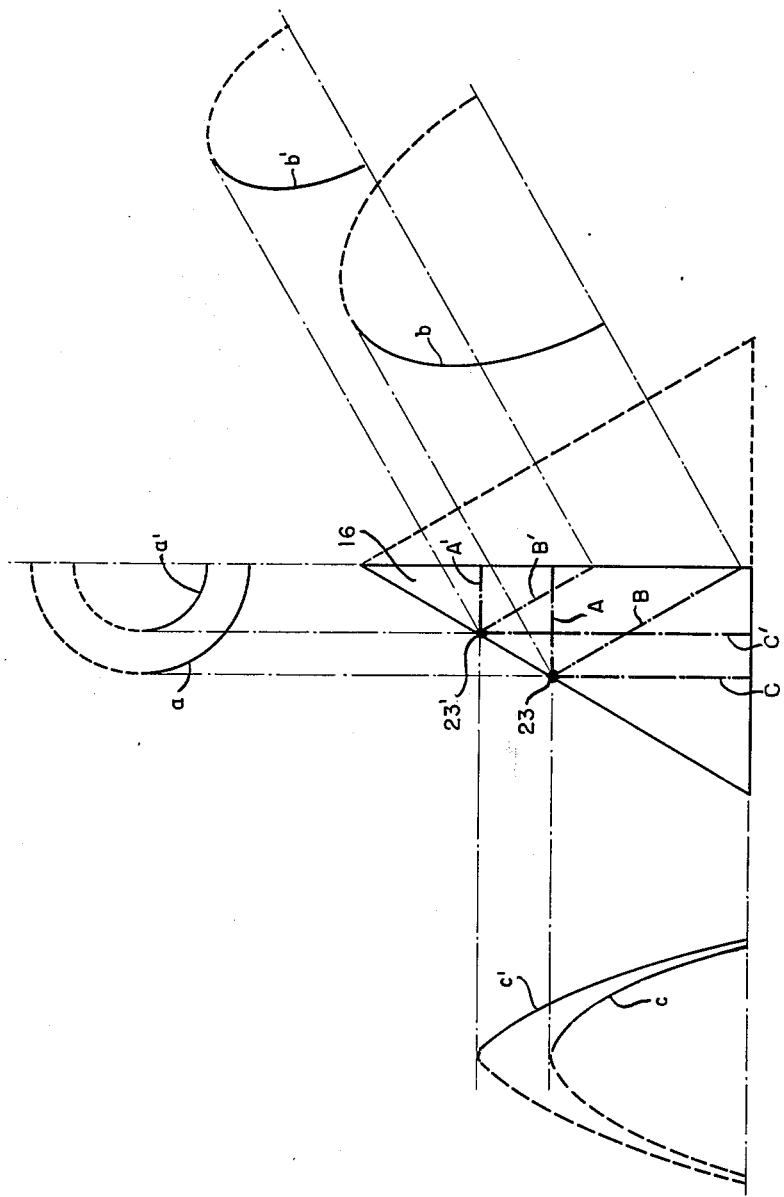

Referring now to the drawings:
FIG. 1 is a plan view, partially schematic, of an apparatus for forming a surface of predetermined cross-section;
FIG. 2 is a detailed perspective view of a guide assembly embodied in the apparatus of FIG. 1, while
FIG. 3 is a graph to aid in explaining the operation of the apparatus of FIGS. 1 and 2.

Referring now more particularly to FIGS. 1 and 2 of the drawings, there is illustrated an apparatus for forming a surface of revolution of predetermined cross-section, specifically, of a predetermined radius of curvature, comprising a work-piece holder or chuck 10 in which is secured a work-piece 9, for example a plastic contact lens blank. The chuck 10 is mounted on a shaft 11 rotatably mounted or journaled in the lathe bed 12. The term "radius of curvature" is used to refer not only to the radius of a circular arc but to curves of noncircular character such as a parabola, hyperbola, ellipse, etc. and, in such context, is employed to refer to the least radius of curvature at the apex thereof.

The apparatus further comprises a carriage 13 movable parallel to the axis of rotation of the holder 10 and adapted to be driven in a conventional manner by a lead screw 14 actuated by a suitable motor, not shown. The apparatus further comprises a tool-supporting slide 15 on the carriage 13 carrying a cutting tool 21 and movable horizontally at an angle to the axis of rotation of the holder 10. The apparatus further comprises a stationary guide member 16 having a surface of revolution of a cross-section related to the predetermined cross-section of the surface to be cut on the work-piece 9. Specifically, the member 16 is in the form of a conical guide having an apex angle twice the angle between the direction of movement of the slide 15 and the axis of rotation of the holder 10. The guide 16 is described as stationary in the sense that it is stationary during the actual cutting of any particular work-piece. However, as described hereinafter, it is adjustable for varying the character of the surface being cut. The guide member 16 has a pair of dihedral stop surfaces 17, 18 which may be cut out from a cylindrical member 19, the surface 18 being parallel to the direction of movement of the carriage 13.

The apparatus of the invention further comprises a feeler or stylus 20 having a sharply tapered point and biased into engagement with the guide member 16, whereby movement of the carriage 13 toward the holder 10 causes a transverse movement of a tool 21 mounted on the slide 15 across the work-piece 9 in the holder 10. As illustrated, the slide 15 is actuated directly by a camming action of the guide member 16 on the feeler 20. However, in actual practice, usually there will be associated with the slide 15 a conventional power amplifying servo-mechanism responsive to the engagement of the feeler 20 and the guide member 16 to actuate the slide 15. This servomechanism can have a 1:1 driving ratio, or other driving ratios, in accordance with the nature of the surfaces to be cut, as described hereinafter. In addition, conventional limit switches and safety control mechanisms will be included, as required.

The apparatus of the invention further comprises a pivotal support for the guide member 16 in the form of a pivot shaft 22 disposed to be journaled in the lathe bed 12 and having a pivotal axis tangent to the surface of the guide member 16 at a point 23 at which the feeler 20 contacts the guide member when in one extreme position of the relative movement therebetween. As described more fully hereinafter, adjustment of the guide member 16 about its pivotal axis is effective to alter the nature of the cross-section of the formed work-piece 9.

The apparatus of the invention further comprises means for giving the guide member 16 a translational movement in a direction normal to the axial plane of the holder 10, which is vertical as illustrated in FIGS. 1 and 2. The terms "vertical" and "horizontal" are used herein in their relative sense and are not intended to imply any particular attitude of the apparatus as a whole. Vertical movement of the guide member 16 is effected by virtue of mounting it on a member 24 sliding in a supporting block 25 rigidly secured to the end of the pivot shaft 22 and therefore rotatable therewith. If desired, a micrometer adjustment of the vertical movement of the slide member 24 may be effected by a lead screw 26 and an operating knob 27. Vertical movement of the guide member 16 is effective to alter the radius of curvature of the cross-section of a formed work-piece 9, as described hereinafter.

In the apparatus as so far described, the tool 21 will, in all cases, cut a surface of revolution on the work-piece 9. In some instances, it is desired to cut a surface which has different cross-sections in different planes, as for example, to correct for ophthalmic astigmatism. Such a surface may be cut by providing means for oscillating the guide member 16 about its pivotal axis synchronously with the rotation of the holder 10. Such oscillation may be effected by interconnecting the drive shaft 11 of the work-piece holder 10 with the pivot shaft 22 by any suitable mechanism, such as the drive shafts schematically represented as 28 and 29, an interposed disconnect clutch 30, and speed-changing gear 31. In the event that it is desired to form a surface of different cross-sections in mutually perpendicular planes, for example to impart a cylindrical component to the resultant surface cut on the work-piece 9, the driving ratio between the shafts 11 and 22 is such that the guide member 16 is oscillated at a frequency twice that of the rotation of the holder 10.

It is believed that the operation of the apparatus of the invention will be clear from the foregoing description. In brief, the carriage 13 is initially withdrawn and a work-piece 9 inserted in the holder 10. The slide 15 is adjusted to its extreme lefthand position (FIG. 1) in which the point of the feeler 20 is in alignment with the face 18 of the stop 19 and the point of the tool 21 lies on the axis of the work-piece 9. The carriage 13 is then moved forward manually until it approaches the work-piece 9, whereupon it will be engaged with the lead screw 14 and advanced automatically in a conventional manner. As the carriage 13 reaches the position shown in dotted lines, the tool 21 will engage the center of the work-piece 9. As the carriage 13 is advanced further, engagement of the feeler 20 with the guide surface 16 causes a retraction of the slide 15, an intermediate position being shown in the solid-line positions of the elements. The proportioning of parts is such that, as the feeler 20 reaches the limit of its motion and in engagement with the stop surface 17, the tool 21 will have completed its travel across the face of the work-piece 9 to form a surface of the desired configuration. In this operation, the feeler 20 traverses path B, as explained hereinafter.

The nature of the surface of revolution developed by the operation described above may be best explained by reference to FIG. 3 in which, for the sake of simplicity, the conical guide 16 is assumed to be stationary and the other elements movable relative thereto. If the guide 16 is oriented so that the feeler 20 moves in a plane normal to its axis so that its point of contact is represented by curve $a$ of FIG. 3, then the cross-section of the surface of revolution cut by the tool 21 is represented by curve $a$, the dotted line portion representing the portion of the generated surface opposite that engaged by the tool 21. With this arrangement, the surface cut on the work-piece 9 would be hemispherical. If, now, a vertical movement were imparted to the guide 16 by adjustment of the micrometer knob 27 so that the feeler 20 engages the guide 16 along the trace A', the cross-section of the surface generated by the tool 21 is represented by $a'$ which again represents a hemispherical surface but one of smaller radius of curvature. For simplicity of illustration, the radii of curvatures of the curves $a$ and $a'$ have been considerably exaggerated. In practice, they will correspond to usual radii of curvatures of corrective ophthalmic lenses.

Assuming again that the feeler 20 initially engages the guide 16 at the point 23 but that the guide 16 is rotated about its pivotal axis until the trace of the path of the feeler 20 along its surface is represented by the trace B, as assumed in FIGS. 1 and 2, then the surface formed on the work-piece 9 is paraboloidal, having a cross-section represented by curve $b$. Again, if the guide 16 were then moved vertically so that the initial point of engagement of the feeler 20 were at 23', there would be formed in the work-piece 9 a surface having a cross-section represented by the curve $b'$, which is also paraboloidal but of a smaller radius of curvature as that term is defined herein.

Finally, if the guide 16 is tilted about its pivotal axis until the feeler 20 moves in a plane parallel to the axis of the guide 16, it follows a path on the surface of the guide 16 represented by the trace C. In this case, the surface cut in the work-piece 9 is a hyperboloid having a cross-section represented by curve $c$. Again, if the guide 16 is moved vertically so that the initial point of engagement is at the point 23', the surface cut on the work-piece 9 is a hyperboloid having a cross-section represented by curve $c'$.

The angularities of the several relative positions between the guide 16 and the lathe bed, as represented in FIG. 3, and the radii of curvature of the several surfaces have been considerably exaggerated for the sake of clarity. In practice, in the cutting of ophthalmic lenses, the radii of curvatures will actually be very large. In the embodiment of the invention illustrated, the guide 16 is conical in form, in which case the tool will cut regular geometric surfaces, for example spheroidal, paraboloidal, hyperboloidal, etc. However, the guide 16 may have any desired predetermined configuration related to the configuration of the desired surface to be cut.

In the operation of the apparatus as so far described, the surfaces cut by the tool 21 are symmetrical surfaces of revolution. If it is desired to cut a surface having cross-sections in mutually perpendicular planes which are unsymmetrical or unlike, those can be effected by engaging the mechanism 28–31. For example, in an ophthalmic lens designed to correct astigmatism, the generated surface usually has a cylindrical component in one direction. This can be effected by oscillating the guide 16 about its pivotal axis in synchronism with, and at twice the frequency of, the rotation of the work-piece and the holder 10. With such an operation, one portion of the resulting lens surface will be approximately spheroidal and another portion approximately parabolic with a smooth variation between the two. By varying the speed ratio of the driving mechanism 28–31, the amplitude of oscillation of the guide 16, or both, as well as other parameters of the driving mechanism, it is possible to generate surfaces having a wide range of predetermined configurations.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. An apparatus for forming a surface of revolution of predetermined radius of curvature comprising:
   (a) a rotatable face plate work-piece holder;
   (b) a carriage movable parallel to the axis of said holder;
   (c) a tool-supporting slide on said carriage movable at an acute angle to said axis;
   (d) a conical guide;
   (e) and a feeler mounted on said slide and biased into engagement with said guide, said feeler and said guide being relatively so disposed that longitudinal movement of said carriage toward said holder causes said guide to cam said feeler to produce transverse movement of the tool across a work-piece in said holder.

2. An apparatus for forming a surface of revolution of predetermined radius of curvature comprising:
   (a) a rotatable face plate work-piece holder;
   (b) a carriage movable parallel to the axis of said holder;
   (c) a tool-supporting slide on said carriage movable at an acute angle to said axis;
   (d) a conical guide having an apex angle twice said slide angle;
   (e) and a feeler mounted on said slide and biased into engagement with said guide, said feeler and said guide being relatively so disposed that longitudinal movement of said carriage toward said holder causes said guide to cam said feeler to produce transverse movement of the tool across a work-piece in said holder.

3. An apparatus for forming a surface of predetermined cross-section comprising:
   (a) a rotatable face plate work-piece holder;
   (b) a carriage movable parallel to the axis of said holder;
   (c) a tool-supporting slide on said carriage movable at an acute angle to said axis;
   (d) a guide having a surface of revolution of a cross-section related to said predetermined cross-section;
   (e) a feeler mounted on said slide and biased into engagement with said guide, said feeler and said guide being relatively so disposed that longitudinal movement of said carriage toward said holder causes said guide to cam said feeler to produce transverse movement of the tool across a work-piece in said holder;
   (f) and a pivotal support for said guide having an axis tangent to the surface thereof at a point of contact with said feeler, adjustment of said guide about its axis being effective to alter the cross-section of a formed work-piece.

4. An apparatus for forming a surface of predetermined cross-section comprising:
   (a) a rotatable face plate work-piece holder;
   (b) a carriage movable parallel to the axis of said holder;
   (c) a tool-supporting slide on said carriage movable at an acute angle to said axis;
   (d) a guide having a surface of revolution of a cross-section related to said predetermined cross-section;
   (e) a feeler mounted on said slide and biased into engagement with said guide, said feeler and said guide being relatively so disposed that longitudinal movement of said carriage toward said holder causes said guide to cam said feeler to produce transverse movement of the tool across a work-piece in said holder;
   (f) and means for moving said guide in a direction normal to the axial plane of said holder to alter the radius of curvature of a formed work-piece.

5. An apparatus for forming a surface of predetermined cross-section comprising:
   (a) a rotatable face plate work-piece holder;
   (b) a carriage movable parallel to the axis of said holder;
   (c) a tool-supporting slide on said carriage movable at an acute angle to said axis;
   (d) a guide having a surface of revolution of a cross-section related to said predetermined cross-section;
   (e) a feeler mounted on said slide and biased into engagement with said guide, said feeler and said guide being relatively so disposed that longitudinal movement of said carriage toward said holder causes said guide to cam said feeler to produce transverse movement of the tool across a work-piece in said holder;
   (f) a pivotal support for said guide having an axis tangent to the surface thereof at a point of contact with said feeler, adjustment of said guide about its axis being effective to alter the cross-section of a formed work-piece;
   (g) and means for moving said guide in a direction normal to the axial plane of said holder to alter the radius of curvature of a formed work-piece.

6. An apparatus for forming a surface of predetermined cross-section comprising:
   (a) a face plate work-piece holder rotatable about a horizontal axis;
   (b) a carriage movable parallel to the axis of said holder;
   (c) a tool-supporting slide on said carriage movable in a horizontal plane at an acute angle to said axis;
   (d) a conical guide;
   (e) a feeler mounted on said slide and biased into engagement with said guide, said feeler and said guide being relatively so disposed that longitudinal movement of said carriage toward said holder causes said guide to cam said feeler to produce transverse movement of the tool across a work-piece in said holder;
   (f) a pivotal support for said guide having an axis tangent to the surface thereof at a point of contact with said feeler, adjustment of said guide about its axis being effective to alter the cross-section of a formed work-piece;
   (g) and means for adjustably fixing said guide at different vertical positions to alter the radius of curvature of a formed work-piece.

7. An apparatus for forming a surface of predetermined cross-section comprising:
   (a) a rotatable face plate work-piece holder;
   (b) a carriage movable parallel to the axis of said holder;
   (c) a tool-supporting slide on said carriage movable at an acute angle to said axis;
   (d) a guide having a surface of revolution of a cross-section related to said predetermined cross-section;
   (e) a feeler mounted on said slide and biased into engagement with said guide, said feeler and said guide being relatively so disposed that longitudinal movement of said carriage toward said holder causes said guide to cam said feeler to produce transverse movement of the tool across a work-piece in said holder;
   (f) and means for oscillating said guide member about its axis synchronously with the rotation of said holder to form a surface of different cross-sections in different planes.

8. An apparatus for forming a surface of predetermined cross-section comprising:
   (a) a rotatable face plate work-piece holder;
   (b) a carriage movable parallel to the axis of said holder;
   (c) a tool-supporting slide on said carriage movable at an acute angle to said axis;
   (d) a guide having a surface of revolution of a cross-section related to said predetermined cross-section;
   (e) a feeler mounted on said slide and biased into engagement with said guide, said feeler and said guide being relatively so disposed that longitudinal movement of said carriage toward said holder causes said guide to cam said feeler to produce transverse movement of the tool across a work-piece in said holder;

(f) and means for oscillating said guid member about its axis at a frequency twice that of the rotation of said holder to form a surface of different cross-sections in mutually perpendicular planes.

9. An apparatus for forming a surface of predetermined cross-section comprising:
(a) a rotatable face plate work-piece holder;
(b) a carriage movable parallel to the axis of said holder;
(c) a tool-supporting slide on said carriage movable at an acute angle to said axis;
(d) a guide having a surface of revolution of a cross-section related to said predetermined cross-section and dihedral stop surfaces one of which is parallel to the direction of carriage movement;
(e) and a feeler mounted on said slide and biased into engagement with said guide, said feeler and said guide being relatively so disposed that longitudinal movement of said carriage toward said holder causes said guide to cam said feeler to produce transverse movement of the tool across a work-piece in said holder.

10. In an apparatus for forming a surface of predetermined cross-section including a frame and a tool holder movable relative thereto and having a guide feeler for controlling its motion, a guide comprising:

(a) a member having a surface of revolution of a cross-section related to said predetermined cross-section;
(b) and a pivotal support for said member having an axis tangent to the surface thereof at a point of contact with the guide feeler.

11. In an apparatus for forming a surface of revolution of predetermined radius of curvature including a frame and a tool holder movable relative thereto and having a guide feeler for controlling its motion, a guide comprising:
(a) a conical member having a predetermined cross-section;
(b) and a pivotal support for said member having an axis tangent to the surface thereof at a point of contact with the guide feeler.

References Cited by the Examiner

UNITED STATES PATENTS

| | | | |
|---|---|---|---|
| 2,720,130 | 10/55 | Chang | 82—14 X |
| 2,784,648 | 3/57 | Von Zelewsky. | |
| 2,966,084 | 12/60 | LeBrusque | 82—14 |
| 3,063,317 | 11/62 | D'Aloisio et al. | 82—14 |
| 3,079,732 | 3/63 | Rawstron et al. | 90—58 |

WILLIAM W. DYER, JR., *Primary Examiner.*

LEON PEAR, *Examiner.*